(12) United States Patent
Scherba

(10) Patent No.: US 9,278,291 B2
(45) Date of Patent: *Mar. 8, 2016

(54) INFLATABLE EDUCATIONAL STRUCTURE

(75) Inventor: Robert J. Scherba, Richfield, OH (US)

(73) Assignee: Scherba Industries, Inc., Brunswick, OH (US)

( * ) Notice: Subject to any disclaimer, the term of this patent is extended or adjusted under 35 U.S.C. 154(b) by 995 days.

This patent is subject to a terminal disclaimer.

(21) Appl. No.: 12/946,107

(22) Filed: Nov. 15, 2010

(65) Prior Publication Data

US 2011/0059676 A1    Mar. 10, 2011

Related U.S. Application Data

(63) Continuation of application No. 11/969,383, filed on Jan. 4, 2008, now Pat. No. 7,878,877.

(60) Provisional application No. 61/007,032, filed on Dec. 10, 2007.

(51) Int. Cl.
| | | |
|---|---|---|
| *A63H 3/06* | (2006.01) | |
| *A63G 31/12* | (2006.01) | |
| *A63G 9/00* | (2006.01) | |
| *G09B 25/04* | (2006.01) | |
| *A63G 31/00* | (2006.01) | |

(52) U.S. Cl.
CPC ........ *A63G 31/12* (2013.01); *A63G 9/00* (2013.01); *G09B 25/04* (2013.01); *A63G 31/007* (2013.01)

(58) Field of Classification Search
USPC .................................. D21/820; 446/220–226
See application file for complete search history.

(56) References Cited

U.S. PATENT DOCUMENTS

| | | | |
|---|---|---|---|
| 4,526,548 A | | 7/1985 | Livingston |
| D281,985 S | * | 12/1985 | Spirk et al. ................... D21/818 |
| D314,024 S | | 1/1991 | Micale |
| 5,173,052 A | | 12/1992 | Duncan, Jr. |
| D355,693 S | * | 2/1995 | Aker et al. ................... D21/818 |
| D365,400 S | | 12/1995 | Scherba |
| 5,471,797 A | * | 12/1995 | Murphy ........................ 52/2.17 |
| 5,555,679 A | | 9/1996 | Scherba |
| 5,713,052 A | | 1/1998 | Kawasaki et al. |
| 5,733,165 A | * | 3/1998 | Kelley ........................... 446/73 |
| 5,752,835 A | | 5/1998 | Whitmer, Sr. |
| 5,890,338 A | * | 4/1999 | Rodriguez-Ferre .......... 52/582.1 |
| 5,893,238 A | | 4/1999 | Peacock et al. |
| D413,169 S | | 8/1999 | Scherba |
| 5,937,586 A | | 8/1999 | Scherba |
| 6,001,020 A | * | 12/1999 | Nagelski et al. .............. 472/116 |
| D439,946 S | | 4/2001 | Gourchounian |
| D440,622 S | | 4/2001 | Gourchounian |
| 6,527,418 B1 | | 3/2003 | Scherba |
| 6,565,405 B2 | | 5/2003 | Hsu et al. |
| D481,093 S | | 10/2003 | Mixon |
| 6,650,246 B2 | | 11/2003 | Field et al. |
| 6,679,007 B1 | | 1/2004 | Minchew et al. |
| 6,722,084 B2 | | 4/2004 | Berman |

(Continued)

OTHER PUBLICATIONS

Fema, Mar. 2005, www.usfa.fema.gov, 1-3.*

*Primary Examiner* — Gene Kim
*Assistant Examiner* — Matthew B Stanczak
(74) *Attorney, Agent, or Firm* — Fay Sharpe, LLP

(57) ABSTRACT

An inflatable device designed to provide safety information to a plurality of people. The inflatable device includes at least one meeting venue and at least one at least one physical activity feature. The meeting includes an inflatable structure.

24 Claims, 5 Drawing Sheets

(56) References Cited

U.S. PATENT DOCUMENTS

| | | |
|---|---|---|
| 6,935,073 B2 | 8/2005 | Scherba |
| D522,082 S | 5/2006 | Peterson |
| 7,114,276 B2 | 10/2006 | Scherba |
| D540,413 S | 4/2007 | McKee et al. |
| 7,213,357 B2 | 5/2007 | Scherba |
| 7,231,739 B2 | 6/2007 | Scherba |
| 7,300,354 B2 | 11/2007 | Field et al. |
| D557,369 S | 12/2007 | Robinson et al. |
| 2007/0167246 A1 | 7/2007 | McKee et al. |
| 2007/0287138 A1 | 12/2007 | Denise |
| 2009/0149111 A1 | 6/2009 | Scherba |

\* cited by examiner

US 9,278,291 B2

INFLATABLE EDUCATIONAL STRUCTURE

The present invention is a continuation application of U.S. patent application Ser. No. 11/969,383 filed Jan. 4, 2008, now U.S. Pat. No. 7,878,877 which in turn claims priority on U.S. Provisional Application Ser. No. 61/007,032 filed Dec. 10, 2007 entitled "Inflatable Educational Structure," which is incorporated herein.

The present invention is directed to inflatable devices and more particularly to an inflatable device that can be used as a educational and entertaining safety tool.

INCORPORATION BY REFERENCE

U.S. Pat. Nos. 7,231,739; 7,213,357; 7,114,276; 6,935,073; 6,527,418; 5,937,586; 5,555,679; D413,169 and D365,400 are incorporated herein fully by reference to illustrate inflatable devices; the manner in which such inflatable devices can be made, inflated and/or connected together; and types of components and/or accessories that can be used with such inflatable devices. Such inflatable devices and/or components and accessories for such inflatable devices can be used in the present invention.

BACKGROUND OF THE INVENTION

Child safety continues to be a primary concern for parents throughout the United States. Many communities and schools have events to provide safety education to children and adults alike. One common event safety event is a fire safety event. In such fire safety events, the fire department typically provides a presentation about fire safety and what to do when encountering a fire in a home or building. During these presentations, the fire department may provide visual aids to held explain about safety. These visual aids are also helpful in maintaining the attention of the children during the safety presentation.

One type of visual aid that is used by fire departments is a mobile instruction facility. These mobile facilities are generally converted mobile homes that include various fire safety exhibits. Non-limiting examples of such mobile instruction facilities are disclosed in U.S. Pat. Nos. 4,526,548; 5,173,052; and 5,752,835, all of which are incorporated by reference in their entirety.

Although these mobile instruction facilities identified in the above prior art patents are very useful and helpful in teaching children about fire safety, these mobile instruction facilities are very expensive to purchase, typically costing over $100,000. As such, many small communities cannot afford to purchase these mobile instruction facilities. In addition, these mobile instruction facilities are generally large converted trailers that require a large and secure storage facility. Furthermore, since these large converted trailers must be moved on roads or flat surfaces, the locations that these mobile instruction facilities can be used is limited. Also, because these mobile instruction facilities are typically formed in trailers, the layout of the facility is very limited, thus limiting the types of presentations that can occur in such facilities.

In view of the current state of the art of mobile instruction facilities, there is a need for a less expensive mobile facility, a mobile facility that can be used in a greater variety of locations, a mobile facility that can be easily and conveniently stored, and a mobile facility that can be configured in a variety of arrangements.

SUMMARY OF THE INVENTION

The present invention relates to an inflatable device adapted and designed to supply safety information to individuals or groups and will be particularly described with reference thereto. However, the present invention has broader applications in that the inflatable device can be used to provide other types of information. The inflatable device of the present invention overcomes the limitations of past mobile safety instruction facilities.

The present invention is directed to an inflatable device that incorporates one or more types of information (e.g., fire safety information, emergency evacuation information, personal safety information, safety information about poisonous materials, firearm safety, medication safety, etc.) on, in and/or about the inflatable device. The information used on, in and/or about the inflatable device is generally directed to some type of safety information, disaster prevention information and/or emergency information; however, the information can be other or additional types of information. This information can be 1) printed, painted, mounted and/or connected on one or more interior and/or exterior walls, ceilings, and/or floors of the inflatable device, 2) projected on to one or more interior and/or exterior walls, ceilings, and/or floors of the inflatable device by one or more multimedia devices, and/or 3) provided by audio sound by one or more multimedia devices. As can also or alternatively be appreciated, print material can be on display or provided in the inflatable device that provides such information. As can further or alternatively be appreciated, one or more instructors, robots, computers, etc. can available, on display or provided in the inflatable device to provide one or more types of information. Non-limiting examples of multimedia devices that can be used include, but are not limited to, audio equipment (e.g., receivers, CD player, DVD player, mini-DVD player, tape player/recorder, MP3 player, Ipod, cell phone, IPhone, turntable, speakers, amplifiers, equalizers and processors, digital audio recorders, mixers, effectors, microphone, etc.), video equipment (e.g., VCR, DVD player, T.V. receiver, T.V. tuner, cable box, satellite box, cathode ray tube screen, plasma screen, LCD screen, diode screen, DLP screen, camcorder, camera, digital video recorder, projector, switchers, matrix switchers, IR and/or RF controllers, IR and/or RF remote controllers, etc.), satellite equipment (e.g., satellite dish, satellite receiver and/or satellite box, etc.), computer equipment (e.g., desktop computer, laptop computer, printer, scanner, monitor, modem, game controllers, keyboard, data storage devices, mouse, software, internet connections, satellite connections, etc.), game systems (e.g., Xbox, Playstation, Game cube, Wii, Nintendo 64, Nintendo DS, Game Boy, Nintendo Playstation Portable, etc.), communications equipment (e.g., telephone, cellular phone, IPhone, cable connection, DSL connection, telephone connection, satellite connection, T1 connection, modem, wired and/or wireless routers, etc.), power equipment, lighting (e.g., lasers, incandescent lights, diode lights, halogen lights, Xenon lights, florescent lights, etc.) and/or lighting equipment. The multimedia devices are designed in part to enhance the visual effects of the inflatable device, provide one or more viewers with a stream of information and/or make the inflatable device interactive with one or more viewers. In one non-limiting embodiment of the invention, the inflatable device includes video equipment that is designed to display one or more images on at least a portion of the inflatable device. The one or more displayed images can take many forms. In one non-limiting example, the one or more displayed image include one or more pictures (e.g., slides, transparencies, etc.). In another and/or alternative non-limiting example, the one or more displayed images include prerecorded digital and/or analog images (e.g., VCR tape, DVD, CD, 8 mm tape, other digitally recorded format, etc.). In still another and/or alternative non-limiting example, the one or more displayed images include live images (e.g., live T.V. broadcast, live satellite broadcast, live cable broadcast, live feed from a camera, live computer generated image, etc.). The use of one or more displayed images on the inflatable device can significantly expand the uses of the inflatable and/or enhance the learning experience and/or interested of one or more viewers. In yet another and/or alternative non-limiting embodiment of the invention, the inflatable device includes at least one display screen. In still yet another and/or alternative non-limiting non-limiting embodiment of the invention, the inflatable device includes one or more speakers.

In still another and/or alternative non-limiting aspect of the invention, the inflatable device includes a seating or cavity structure that is designed to support one or more components of multi-media equipment; however, this is not required. When the inflatable device is inflated, one or more multimedia components can be designed to be inserted in the interior and/or on the exterior of the inflatable device. The inflatable component can include one or more structures that can be connected to the interior and/or exterior of the inflatable device after being inflated and/or be formed as the inflatable device is inflated. These structures can be used to conveniently place one or more components of the multimedia equipment in and/or about the inflatable device. In one non-limiting embodiment of the invention, the inflatable device includes at least one ledge that is used to at least partially support one or more pieces of multimedia equipment. Non-limiting examples of these inflatable devices are disclosed in U.S. Pat. Nos. 7,213,357 and 7,114,276, both of which are fully incorporated herein by reference.

In yet another and/or alternative non-limiting aspect of the invention, the inflatable device includes one or more windows. Non-limiting examples of these inflatable devices are disclosed in U.S. Pat. Nos. 7,213,357 and 7,114,276, both of which are fully incorporated herein by reference.

In another and/or alternative non-limiting aspect of the invention, the inflatable device includes one or more support poles and/or structures to facilitate in maintaining the desired shape of the inflatable. When large inflatable devices are used, the inflatable device can have a tendency to sway or move, especially when exposed to wind in an outdoor environment. The one or more support poles and/or structures are designed to reduce the movement of the inflatable device. When the inflatable device includes projected images, the movement of the inflatable device may cause the displayed image to be temporarily distorted. The use of one or more support poles and/or structures reduces this problem. In addition, the movement of the inflatable device may cause one or more multimedia components to be repositioned and/or damaged. The use of one or more support poles and/or structures also reduces this problem. In one non-limiting embodiment of the invention, the inflatable device includes one or more pockets that are designed to receive an end of one or more support poles or structures. In one non-limiting design, at least one pocket is located at or near a corner of the inflatable device. In another and/or alternative non-limiting one embodiment of the invention, the inflatable device includes one or more guide tabs that are designed to maintain the one or more poles and/or structures in a desired position. The one or more guide tabs, when used, typically engage the one or more poles and/or structures between the ends of the one or more poles and/or structures; however, this is not required. In one non-limiting design, at least one guide tab includes a grommet through which the one or more poles and/or structures are inserted. Non-limiting examples of these structures are disclosed in U.S. Pat. Nos. 7,213,357 and 7,114,276, both of which are fully incorporated herein by reference.

In still yet another and/or alternative non-limiting aspect of the invention, the inflatable device is a modular structure that can be attached to and detached from various other inflatable components. In one non-limiting embodiment of the invention, the inflatable device is formed of at least two inflatable components. In another and/or alternative non-limiting embodiment of the invention, two or more of the inflatable components that at least partially form the inflatable device of the present invention are at least partially releasably connected together. In still another and/or alternative non-limiting embodiment of the invention, at least one of the inflatable components that at least partially form the inflatable device of the present invention are at least partially releasably connected to one or more blowers. The one or more inflatable components of the inflatable device can take on a number of different shapes and sizes. Typically the one or more inflatable components are at least partially formed from one or more panels; however, this is not required. In one aspect of this embodiment, the sides of the one or more panels, when used, are connected together to limit the amount of fluid leakage from the connected panel edges; however, this is not required. The one or more panels, when used, can be connected in a number of ways such as, but not limited to, a melted seam, glued edges, stitched edges, laced edges, zipped edges, VELCRO connected edges, snapped and/or buttoned edges, tongue and groove connected edges, hooked edges, etc. and/or by any combination of these arrangements. In another and/or alternative non-limiting aspect of this embodiment, the one or more panels, when used, include a flexible and durable material such as, but not limited to, coated nylon materials, coated Kevlar materials, and/or the like. Such materials are generally flexible, durable, fluid repellant, and/or substantially fluid impermeable so as to be inflated and deflated without damage or with minimal damage, and/or are durable enough to resist wear and/or exposure to the elements over an extended period of time; however, this is not required. As can be appreciated, a wide variety of additional or other materials which are flexible, durable, fluid repellant, and/or substantially non-permeable to various fluids (e.g. liquid, gas, etc.) can used by the present invention. In still another and/or alternative non-limiting aspect of this embodiment, the one or more inflatable component can include at least one fluid opening to enable a fluid to flow into and/or out of the inflatable component; however, this is not required. In accordance with a further and/or alternative non-limiting embodiment of the invention, two or more inflatable components of the inflatable device include a connector that at least partially allows fluid to pass between the modular component and allow the inflatable components to be at least partially releasably connected to one another; however, this is not required. In one non-limiting aspect of this embodiment of the invention, the connector, when used, includes a base having an opening that at least partially allows fluid to pass through the opening. In another and/or alternative non-limiting aspect of this embodiment of the invention, the base of the connector is connected to a blower or secondary inflatable component to which the inflatable component is to be connected; however, this is not required. When an inflatable component is to be connected to a blower, the base of the connector is typically formed on and/or connected to the end of the blower; however, this is not required. In still another and/or alternative non-limiting aspect of this embodiment, when one inflatable component is connected to another inflatable component, the base of the connector is formed on and/or connected to one of the inflatable components; however, this is not required. In yet another and/or alternative non-limiting aspect of this embodiment, the base of the connector can have a variety of shapes and/or sizes, and/or have a variety of opening sizes in the base. In still yet another and/or alternative non-limiting aspect of this embodiment, the base of the connector is at least partially formed from a durable material to resist wear; however, this is not required. Such materials can include, but are not limited to, hard plastic, rubber, fiberglass, metal and/or the like. In still yet a further and/or alternative non-limiting aspect of this embodiment, the base can include a connection flange adapted to be connected to an inflatable component, secondary inflatable component, and/or blower; however, this is not required. The connection flange, when used, typically fully extends around the perimeter of the base; however, this is not required. In still another and/or alternative non-limiting aspect of this embodiment, the base can include an extension wall that rises upwardly from the connection flange; however, this is not required. In yet another and/or alternative non-limiting aspect of this embodiment, the connection flange, when used, contacts the interior surface of the panel of an inflatable component when the connection flange is connected; however, this is not required. In still yet another and/or alternative non-limiting aspect of this embodiment, a fluid obstructor to inhibit fluid flow can be positioned on and/or about the fluid opening in the base; however, this is not required. The fluid obstructor, when used, is designed to interfere with the flow of fluid through the opening. Such a fluid obstructor can include, but is not limited to, a valve, a mesh material, filter material, semi-permeable material, and/or the like. The fluid obstructor, when used, can be used as a dampener to assist in ensuring an inflatable module remains inflated, etc; however, this is not required. In accordance with still another and/or alternative non-limiting embodiment of the present invention, the connector can include a cap that is designed to at least partially releasably connect to the base of the connector; however, this is not required. In one non-limiting aspect of this embodiment, the cap, when used, is designed to at least partially secure one inflatable component to another inflatable component, and/or blower; however, this is not required. In another and/or alternative non-limiting aspect of this embodiment, the cap, when used, includes one or more openings to at least partially allow fluid to at least partially pass through the connector when the cap is at least partially releasably connected to the base; however, this is not required. In yet another and/or alternative non-limiting aspect of this embodiment, the cap, when used, includes a connection arrangement to at least partially releasably connect the cap to the base. The connection arrangement can take a number of different arrangements. The connection arrangement can include at least one thread on the cap so that the cap can be at least partially threaded on the base of the improved connector; however, this is not required. As can be appreciated, other and/or additional arrangements can be used to releasably connect the cap to the base of the improved connector. Such arrangements, when used, can include, but are not limited to, snaps, buttons, zippers, twist lock, connection rings, VELCRO, clamps, roping, locks, etc. In still another and/or alternative non-limiting aspect of this embodiment, the connection arrangement can include a securing flange on the cap and/or base which securing flange is used to releasably connect the base and the cap; however, this is not required. The cap can include a securing flange and/or the base can include a securing flange; however, this is not required. In still and/or alternative non-limiting aspect of this embodiment, the securing flange, when used, can include a connector to releasably secure to the cap or base or securing flange of the cap or base; however, this is not required. The connector, when used, can include a number of different arrangements such as, but are not limited to, snaps, buttons, zippers, twist lock, connection rings, VELCRO, clamps, roping, locks, etc. In yet another and/or alternative non-limiting aspect of this embodiment, the cap, when used, can include a sealing flange that extends at least partially about the perimeter of the cap; however, this is not required. The sealing flange, when used, can be adapted to at least partially entrap and/or secure a portion of the panel of the inflatable component between the sealing flange and a portion of the base of the connector; however, this is not required. As such, the sealing flange, when used, can be designed to at least partially secure a portion of the inflatable component when the cap is releasably connected to the base; however, this is not required. The base of the improved connector can include a sealing landing that extends at least partially about the perimeter of the base; however, this is not required. The sealing landing, when used, can be adapted to at least partially entrap and/or secure a portion of the panel of the inflatable component between the sealing flange and the sealing landing when the cap is releasably connected to the base; however, this is not required. The connection flange of the base, when used, can also function as the sealing landing; however, this is not required. The sealing landing, when used, can be spaced from the connection flange of the base; however, this is not required. In this non-limiting design, the sealing landing, when used, can be positioned adjacent to, about, or below the connection flange. In still yet another and/or alternative non-limiting aspect of this embodiment, the cap, when used, can include a one or more gripping elements to facilitate in the insertion and/or removal of the cap from the base of the improved connector; however, this is not required. In accordance with still yet another and/or alternative non-limiting embodiment of the invention, at least one inflatable component can include a connection disk; however, this is not required. The connection disk, when used, can have a variety of shapes and/or sizes. The connection disk, when used, can include an opening that is at least partially aligned with and/or is in fluid communication with the fluid opening in the inflatable component; however, this is not required. In one non-limiting aspect of this embodiment, the connection disk can be designed to at least partially reinforce the region of the inflatable component and/or inhibit damage to the region of the inflatable component that is entrapped and/or secured between the base and the cap when the cap is releasably connected onto the base of the connector; however, this is not required. In another and/or alternative non-limiting aspect of this embodiment, the connection disk, when used, can be designed to at least partially inhibit or prevent the region of the inflatable component that is entrapped and/or secured between the base and the cap when the cap is releasably connected to the base of the connector from disengaging from the cap and/or base; however, this is not required. In still another and/or alternative non-limiting aspect of this embodiment, the connection disk, when used can be at least partially made of a more rigid and/or resilient material than the material of the inflatable component; however, this is not required. In yet another and/or alternative non-limiting aspect of this embodiment, the connection disk, when used, can be at least partially made of the same or similar material as that of the inflatable component; however, this is not required. In still yet another and/or alternative non-limiting aspect of this embodiment, the connection disk, when used, can be secured to one or more inflatable components; however, this is not required. The connection disk, when used, can be secured to the inflatable component in any number of ways such as, but not limited to, a melted seam, adhesive, stitching, lacing, zipper, VELCRO, snaps and/or buttons, tongue and groove connection, hooks, connection rings, clamps, etc., and/or by any combination of these arrangements. In a further and/or alternative non-limiting aspect of this embodiment, the connection disk, when used, can be designed to be at least partially entrapped and/or secured between the base and the cap when the cap is releasably connected to the base of the connector; however, this is not required. In accordance with still a further and/or alternative non-limiting embodiment of the invention, two or more inflatable components, when used, can be designed to be used with a joining arrangement that is designed to at least partially releasably secure the two or more inflatable components; however, this is not required. The joining arrangement, when used, can be designed to at least partially secure the inflatable components at a position at least partially spaced from the connector; however, this is not required. In one non-limiting aspect of this embodiment, the joining arrangement, when used, can be spaced from the connector; however, this is not required. In another and/or alternative non-limiting aspect of this embodiment, the joining arrangement, when used, can include one or more arrangements such as, but not limited to, lacing, zipper, rope, straps, VELCRO, snaps and/or buttons, tongue and groove connection, connection rings, hooks, etc. and/or by any combination of these arrangements; however, this is not required. The joining arrangement, when used, can include ropes, straps, lacing or the like at least partially connected to the inflatable component; however, this is not required. The rope, straps, lacing or the like, when used are adapted to be connected to one or more connectors on the one or more secondary inflatable components. Such connectors, when used, can include, but are not limited to, hooks, grommets, loops, clamps, and/or the like. In one non-limiting design, the hooks, grommets, loops, clamps, and/or the like, when used, are connected to a flange, which in turn is connected to one inflatable component. The flange, when used, is typically flexible; however, this is not required. The flange, when used, can be made of the same or different material as one of the inflatable components. The flange, when used, typically is nonreleasably secured to one of the inflatable components; however, this is not required. The flange, when used, can be designed to facilitate in the orienting of the hooks, grommets, loops, clamps, and/or the like relative to an inflatable component during the connection and disconnection process; however, this is not required. In another and/or alternative non-limiting aspect of this embodiment, the joining arrangement, when used, can include ropes, straps, lacing or the like at least partially connected to the secondary inflatable component; however, this is not required. The rope, straps, lacing or the like, when used, can be adapted to be connected to connectors on an inflatable component; however, this is not required. Such connectors can include, but are not limited to, hooks, grommets, loops, clamps, and/or the like. In one non-limiting design, the hooks, grommets, loops, clamps, and/or the like, when used, can be connected to a flange, which in turn is connected to the inflatable component; however, this is not required. The flange, when used, can be flexible; however, this is not required. The flange can be made of the same or different material as one of the inflatable components. The flange, when used, can be nonreleasably secured to the inflatable component; however, it can be releasably secured to the inflatable component. The flange, when used, can be used to facilitate in the orienting of the hooks, grommets, loops, clamps, and/or the like relative to the one of the inflatable components during the connection and disconnection process; however, this is not required. In still another and/or alternative non-limiting aspect of this embodiment, the joining arrangement, when used, can be designed to be the primary arrangement to at least partially releasably secure two or more inflatable components. The connector, when used, can also be used to facilitate in securing together two or more inflatable components; however, this is not required. When the joining arrangement is used, the joining arrangement typically functions as the principal arrangement to at least partially releasably secure the inflatable components; however, this is not required. In accordance with still a further and/or alternative non-limiting embodiment of the present invention, one or more inflatable components can include at least one access opening to enable an individual to insert the cap onto and/or remove the cap from the base of the connector during the connecting and/or disconnecting of the inflatable components and/or from a blower; however, this is not required. In one aspect this embodiment, the access opening, when used, can be located in at least one panel of the inflatable component and adjacent to the fluid opening of an inflatable component; however, this is not required. During the connection of one inflatable component with another inflatable component and/or blower, the fluid opening in the inflatable component can be inserted at least partially about the extension wall of the base of the connector; however, this is not required. The individual connecting the inflatable component to another component can place his/her hand through the access opening and guide the fluid opening in the inflatable component at least partially about the extension wall of the base of the connector; however, this is not required. Once the fluid opening is inserted about the extension wall of the base, the individual can then place his/her hand through the access opening and releasably secure the cap onto the base of the connector; however, this is not required. In another and/or alternative non-limiting aspect of this embodiment, the access opening can be at least partially closable to at least partially inhibit fluid from passing through the access opening; however, this is not required. The access opening can be at least partially closed by, but not limited to, a zipper, VELCRO, buttons, snaps, hooks and/or the like; however, this is not required. In still another and/or alternative non-limiting aspect of this embodiment, an inflatable component can be connected to another inflatable component via the securing arrangement before or after the access opening is used to releasably secure the cap to the base; however, this is not required. When the inflatable component needs to be replaced and/or removed from another inflatable component, the above described sequence of steps can be reversed; however, this is not required. In accordance with still yet a further and/or alternative non-limiting embodiment of the present invention, the connection arrangement, when used, can include a securing mechanism to inhibit or prevent the base and cap from inadvertently releasably connecting from one another; however, this is not required. Such securing arrangement, when used, can include a variety of arrangements such as, but not limited to, bolts, screws, pins, clips, snaps, connection rings, hooks, latches, roping, etc. and the like; however, this is not required. Non-limiting connectors that can be used are illustrated in U.S. Pat. Nos. 6,935,073 and 7,231,739, both of which are fully incorporated herein by reference.

In accordance with still yet a further and/or alternative non-limiting aspect of the present invention, the inflatable device can be used by itself or in combination with one or more other inflatable devices; however, this is not required. In one non-limiting embodiment of the invention, the sides of at least one inflatable device and one or more other inflatable devices can be aligned so that a fluid opening between the inflatable devices are at least partially aligned, thereby providing a passageway for the fluid between the interiors of the inflatable devices; however, this is not required. In another and/or alternative non-limiting embodiment of the invention, the fluid opening in one inflatable component, when such an opening exists, is typically smaller than the surface area of the panel the fluid opening is inserted therein, so as to create a pressure drop when the fluid passes through the fluid opening; however, this is not required. This type of fluid opening design can be used to facilitate in maintaining the inflatable component in a substantially fully inflated state. Furthermore, the inflatable component can be designed to resist deflating when one of the sides of the inflatable component is impacted; however, this is not required. This damping action of pressure differentials between two or more inflatable components can be used to help to stabilize and maintain the integrity of the inflatable device; however, this is not required. In still another and/or alternative non-limiting embodiment, the fluid opening in the inflatable component can be positioned substantially in the center of the panel containing the fluid opening to provide a substantially uniform fluid flow and/or fluid pressure into and/or out of the inflatable component; however, the fluid opening can be positioned in other locations on the panel. In yet another and/or alternative non-limiting embodiment, a semi-permeable boundary can be positioned at least partially about the fluid opening to limit the fluid flow through the semi-permeable boundary; however, this is not required. In one aspect of this non-limiting embodiment, the semi-permeable boundary can include, but is not limited to, a mesh material, semi-fluid permeable material, and/or the like; however, this is not required. In one non-limiting arrangement, the mesh material can be similar to or the same as disclosed in U.S. Pat. No. 5,937,586, which is fully incorporated herein by reference; however, this is not required.

In accordance with yet another and/or alternative non-limiting aspect of the present invention, one or more inflatable components of the inflatable device can be at least partially formed by multiple panels; however, this is not required. In one non-limiting embodiment, the manner in which the inflatable component can be formed can be similar to or the same as the manner disclosed in U.S. Pat. No. 5,937,586, which is fully incorporated herein by reference; however, this is not required.

In accordance with still another and/or alternative non-limiting aspect of the present invention, one or more inflatable components of the inflatable device can include an air vacating arrangement which provides for quick deflation of the inflatable component the inflatable component that being disassembled; however, this is not required. The air vacating mechanism, when used, can also be designed to allow access to the interior of the inflatable component for purposes of repair, assembly, disassembly, insertion of weights, etc.; however, this is not required. In one non-limiting embodiment, the design and/or arrangement of the air vacating arrangement can be similar to or the same as the manner disclosed in U.S. Pat. No. 5,937,586, which is fully incorporated herein by reference; however, this is not required.

In accordance with still yet another and/or alternative non-limiting aspect of the present invention, one or more inflatable components of the inflatable device can include a support structure to support at least a portion of the inflatable component; however, this is not required. In one non-limiting embodiment of the invention, the support structure can include a pole support to at least partially support and/or secure a pole to the inflatable component; however, this is not required. In one non-limiting aspect of this embodiment, the design and/or arrangement of the pole support can be similar to or the same as the pole structures disclosed in U.S. Pat. No. 5,937,586, which is fully incorporated herein by reference; however, this is not required.

In yet another and/or alternative non-limiting aspect of the invention, the inflatable device can include one or more anchor points to secure the inflatable device in a particular position; however, this is not required. In one non-limiting embodiment of the invention, at least one anchor point can include a ring or loop that is adapted to be connected to a chain, cord rope and/or the like; however, this is not required. In one non-limiting aspect of this embodiment, a flexible material can be connected to the ring or loop atone end and connected to the inflatable device at another end; however, this is not required. In another and/or alternative non-limiting embodiment of the invention, one or more anchor points are positioned at or near the base of the inflatable device; however, this is not required. In still another and/or alternative non-limiting embodiment of the invention, one or more anchor points can be positioned above the base of the inflatable device; however, this is not required. In yet another and/or alternative non-limiting embodiment of the invention, one or more anchor points can be positioned at or near an edge of the inflatable device; however, this is not required.

In still yet another and/or alternative non-limiting aspect of the invention, the inflatable device can include one or more meeting venues. Non-limiting configurations of such meeting venues can include, but are not limited to, an enclosure (e.g., an inflatable house, an inflatable building, an inflatable school house, an inflatable firehouse, an inflatable doctors office, an inflatable police station, etc.). The meeting venue can be designed to accommodate a plurality of people to collect in a particular location in and/or about the inflatable device so that some type of information, lecture, discussion and/or viewing can occur in such venue; however, this is not required.

In another and/or alternative non-limiting aspect of the invention, the inflatable device can include a plurality of visual information (e.g, pictures attached to, printed on and/or projected on one or more walls; printed material attached to, printed on and/or projected on one or more walls; etc.) and/or interactive information (e.g., smoke detectors, CO detectors, computer terminals, etc.) regarding safety (e.g., fire hazard information and/or safety, poison information and/or safety, personal safety information, medical information, poisonous gas information and/or safety, etc.); however, this is not required. This visual and/or interactive information can be used as an information source, discussion source and/or teaching source for various types of safety information and issues; however, this is not required.

In still another and/or alternative non-limiting aspect of the invention, the inflatable device can include at least one physical activity feature (e.g., slide, inflatable slide, bouncing area, inflatable bouncing area, obstacle course, inflatable obstacle course, climbing rope, ladder, inflatable ladder, climbing wall, inflatable climbing wall, climbing or sliding pole, inflatable climbing or sliding pole, etc.); however, this is not required. This activity feature, when used, can be used to provide entertainment to children before, during and/or after exposing the children to one or more types of safety information; however, this is not required.

The one non-limiting object of the present invention is to provide an inflatable device that can function as an education and/or entertainment safety device.

Another non-limiting object of the present invention is to provide an inflatable device that can be a lower cost substitute for prior art mobile safety instruction facilities.

Still another non-limiting object of the present invention is to provide an inflatable device that can be used in a many different locations as compared to prior art mobile safety instruction facilities.

Yet another non-limiting object of the present invention is to provide an inflatable device that can be configured in many different configurations as compared to prior art mobile safety instruction facilities.

Still yet another non-limiting object of the present invention is to provide an inflatable device that can be stored in small locations as compared to prior art mobile safety instruction facilities.

These and other objects and sketches will become apparent to those skilled in the art upon reading and following the description taken together with the accompanied drawings.

BRIEF DESCRIPTION OF THE DRAWINGS

Reference may now be made to the drawings which illustrate various non-limiting embodiments that the invention may take in physical form and in certain parts and arrangement of parts wherein.

DESCRIPTION OF THE PREFERRED EMBODIMENTS

Figure 1:
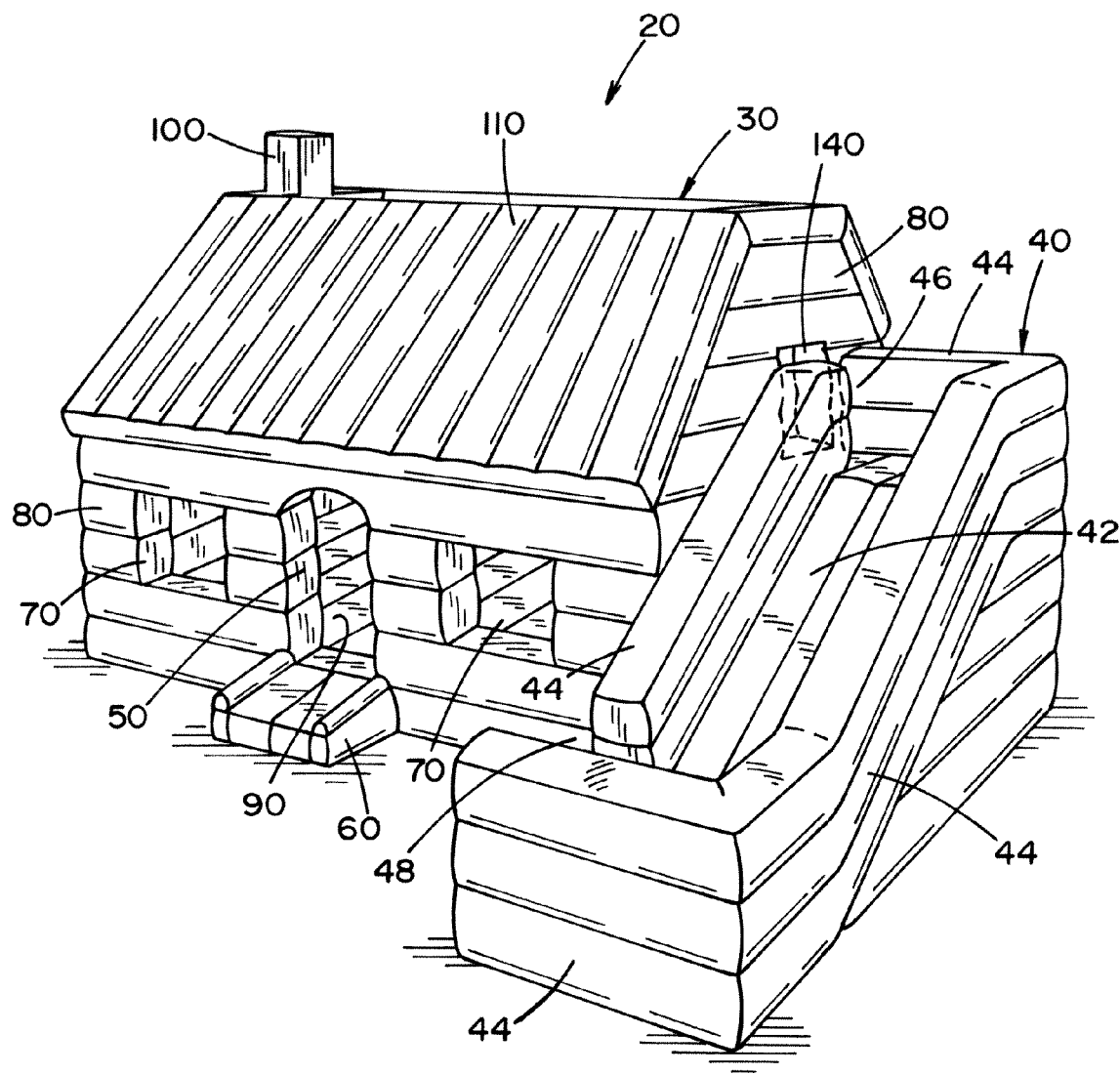
FIG. 1 illustrates a front prospective view of one non-limiting safety house in accordance with the present invention.
Figure 2:
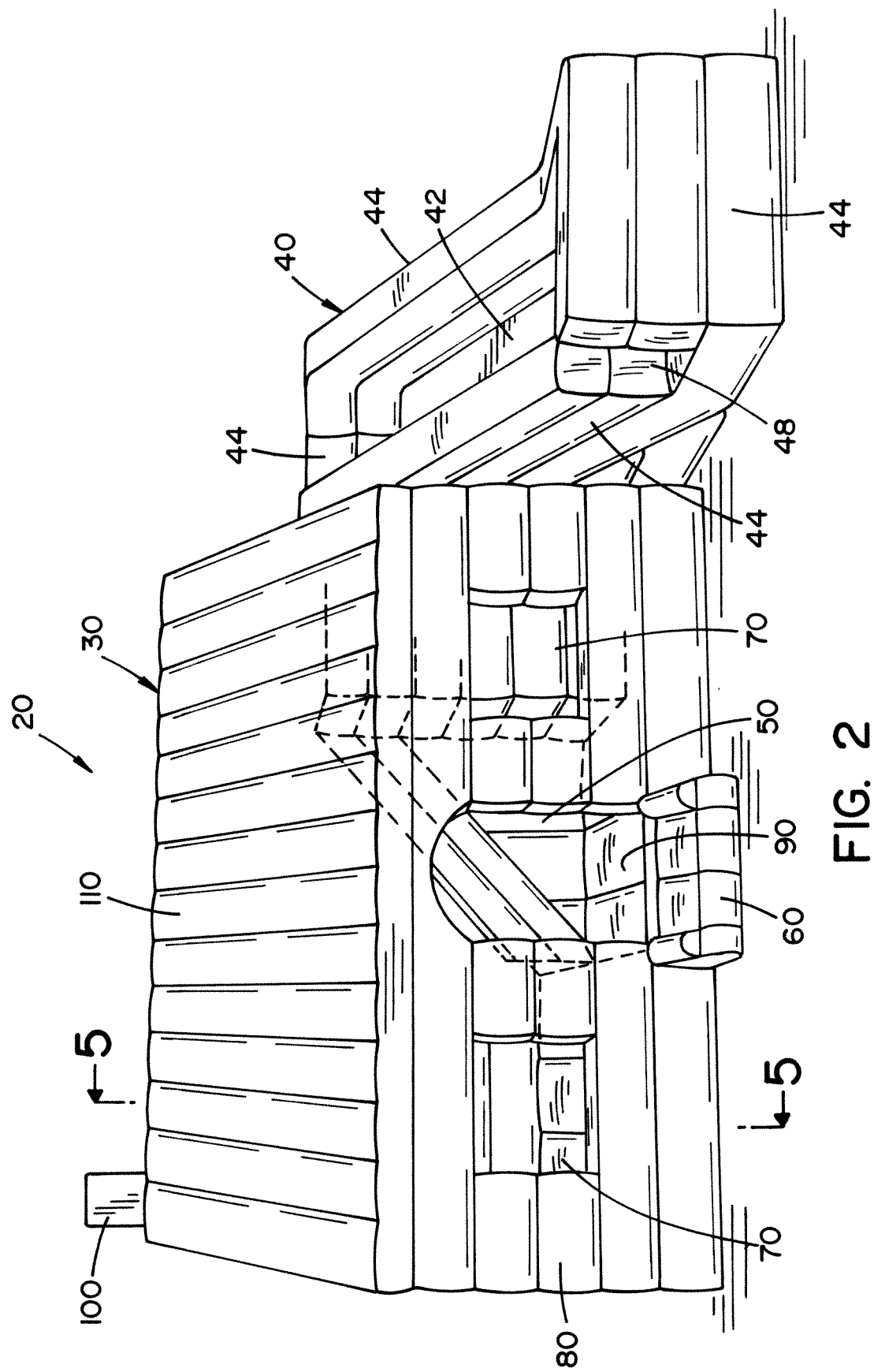
FIG. 2 illustrates a front view of the safety house of FIG. 1.

Referring now to the drawings, wherein the showings are for the purpose of illustrating at least one non-limiting preferred embodiments of the invention only and not for the purpose of limiting the invention, FIGS. 1 and 2 illustrate an inflatable safety house 20 in accordance with the present invention.

The safety house is illustrated as being formed from two inflatable structures, namely a one room enclosed structure 30 and a slide structure 40. The slide structure can be folioed as part of the safety house, or be a separate inflatable device that can be attached or connected to the safety house. As can be appreciated, the inflatable safety house can include other or additional inflatable structures. For example, structure 30 is a meeting venue. Structure 30 could be a multi-room and/or multi-level structure. In addition, structure 30 could include one or more regions that do not include a wall and/or roof. Structure 30 could be in the form of a school house, hospital, police station, fire house, hospital, etc. As can be appreciated, structure 30 can take on almost any desired form which could be used to provide safety information to children and/or adults. Likewise, slide 40 can be some other type of structure (e.g, ladder, inflatable ladder, climbing wall, inflatable climbing wall, pole, inflatable pole, steps, inflatable steps, etc.). Slide 40 can be a partially or fully inflatable device. Likewise, structure 30 can be a partially or fully inflatable device.

Referring again to FIG. 1, structure 30 is in the form of an inflatable one room structure that is used to simulate a room in an actual house. The inflatable one room structure includes at least one entrance 50. The entrance may or may not include a door. Inflatable steps 60 are positioned in from of the entrance; however, this is not required. As can be appreciated, non-inflatable steps, a ramp, etc. can be used to facilitate access to the entrance of the one room structure 30; however, this is not required. The one room structure 30 can include one or more windows 70; however, this is not required. The one or more windows, when used, can include one or more accessories (e.g., shutters, window bar, curtains, blinds, shades, etc.); however, this is not required. These one or more window accessories, when used, can be inflatable and/or non-inflatable accessories. The one room structure 30 includes at least one wall 80. Generally, the one room structure includes at least two walls, more typically at least three walls, and even more typically four walls; however, this is not required. As can be appreciated, the one room structure can include more than four walls, or less than four walls, depending on the particular design and look desired and/or needed for the one room structure. As can also be appreciate, not all of the sides of the one room structure are required to have a wall, thus one or more sides of the room structure could be without a wall, if so desired. One or more of the walls can be inflatable, partially inflatable, or non-inflatable. When the room structure includes one or more windows and/or doors, the one or more windows and/or doors are generally formed in on or more walls. As can be appreciated, one or more fake windows and/or doors can be drawn, printed and/or painted on one or more of the walls; however, this is not required. The one room structure includes an inflatable floor 90; however, this is not required. The inflatable floor, when used, can fully cover or partially cover the floor region of the one room structure. The one room structure includes a chimney stack 100 to add desirable visual attributes to the one room structure; however, such chimney structure is not required. As can be appreciated, other or additional visual attributes for the outside walls and/or roof of the one room structure can be used (e.g., clock, antenna, bell tower, weather vain, vents, lightening rods, dormer window, etc.); however, this is not required. These visual attributes can be inflatable and/or non-inflatable devices. The one room structure can includes a roof 110; however, this is not required. The roof, when used, can fully or partially cover the floor 90 of the one room structure. Generally, the roof, when used, covers at least about 25% of the floor of the one room structure, typically at least about 50% of the floor of the one room structure, and more typically at least about 75% of the floor of the one room structure. In some designs, the roof, when used, covers 100% of the floor of the one room structure. The roof can be inflatable, partially inflatable, or non-inflatable. The outside surfaces of the one room structure can have a variety of different colors (e.g., red, white, etc.) and/or designs (e.g., brick look, stone look, wood panel look, etc.); however, this is not required. The color and/or look of one or more outside surfaces of the one room structure is used to create a visual representation of the type of the structure to be simulated by the one room structure (e.g., house, school house, fire station, police station, etc.).

The slide 40 is illustrated a including a slide surface 42, side walls 44, a slide entrance 46 and a slide exit 48. As can be appreciated, the slide can have many other configurations. The slide can be a fully inflatable device, a partially inflatable device, or a non-inflatable device. The outside surfaces of the slide can have a variety of different colors (e.g., red, white, black, etc.) and/or designs (e.g., fire truck design, police car design, ambulance design, school bus design, etc.); however, this is not required. As illustrated in FIG. 1, the outside of the slide can be made to look like a fire truck; however, it can be appreciated that the outside of slide can have other illustrations. Slide 40 is illustrated as being connected to the one room structure 30; however, this is not required. The slide can be connected to the one room structure such that fluid can flow between the slide and the one room structure; however, this is not required.

Figure 3:
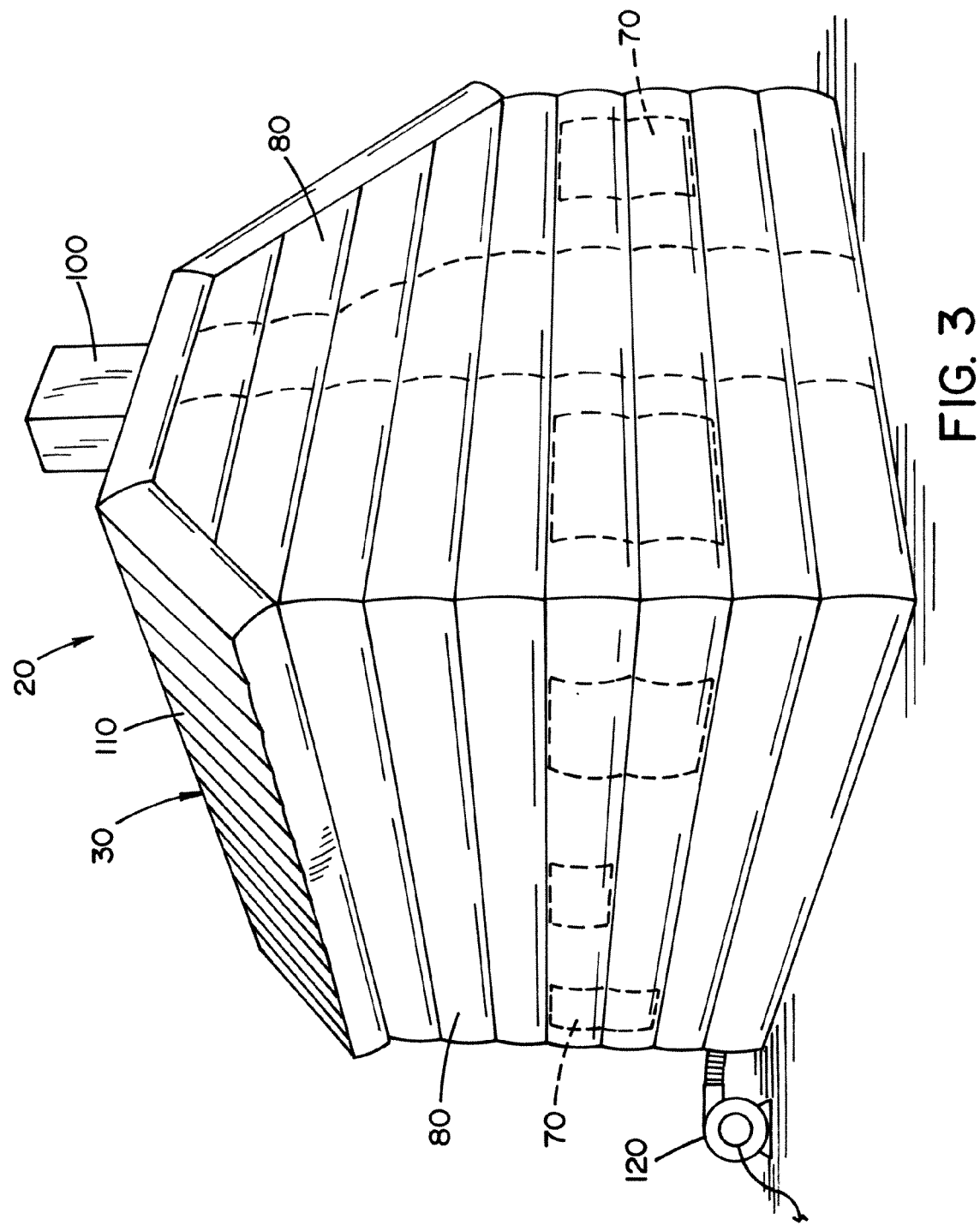
FIG. 3 illustrates a side view of the safety house of FIG. 1.

As illustrated in FIG. 3, one or more fluid blowers and/or pumps 120 (e.g., air blower, etc.) can be used to inflate and maintain the inflation of the one room structure 30 and/or slide 40. The one or more fluid blowers and/or pumps 120 are generally electric air blowers; however, this is not required.

Figure 4:
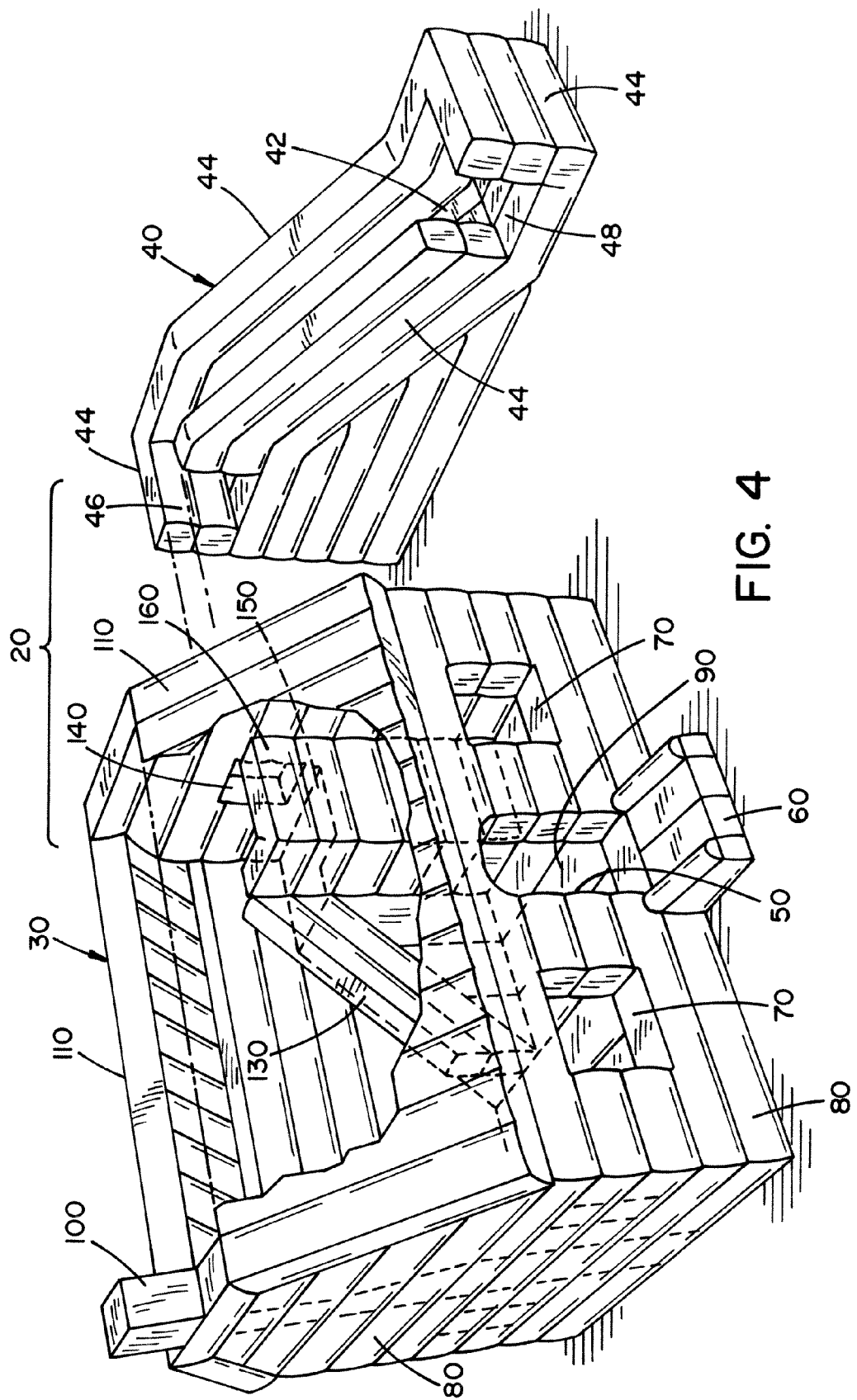
FIG. 4 illustrates a sectional view of the safety house of FIG. 1 which includes a cutaway portion for viewing the inside of the safety house; and, FIG. 5 is a cross-sectional view along line 5-5 of FIG. 2.
Figure 5:
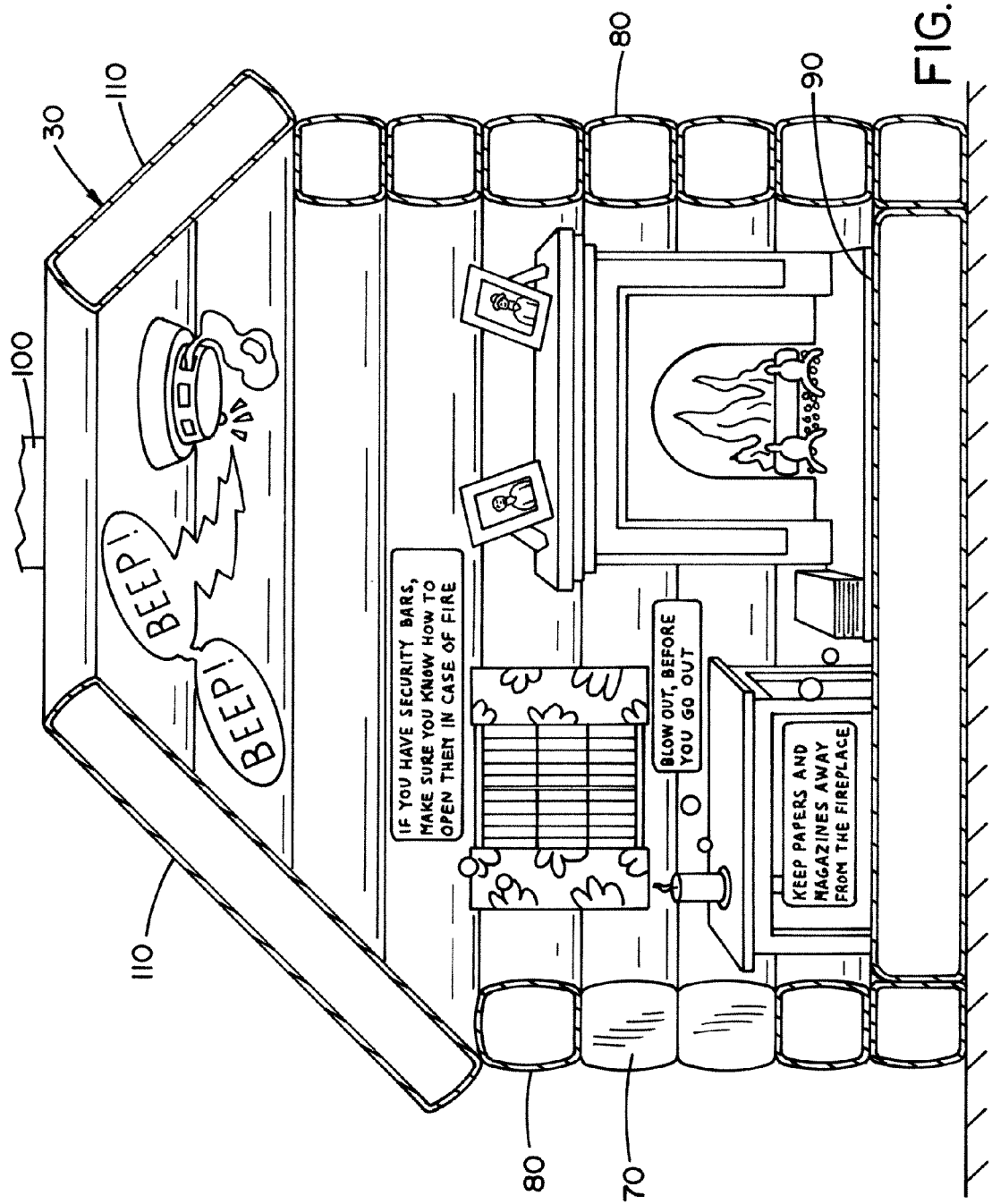

Referring now to FIGS. 4 and 5, the inside of the one room structure 30 is illustrated. As illustrated in FIG. 5, one or more inside walls, the floor and/or the ceiling of the one room structure can have a variety of different colors and/or designs; however, this is not required. Such designs and/or coloring an the one or more inside walls, the floor and/or the ceiling of the one room structure can be used to 1) create the designed setting and/or environment for the one room structure (e.g., make it appear as a room in a home, make it appear as a room in a school, etc.), 2) make the room look like it includes furniture (e.g, chair, couch, table, desk, etc.), 3) make the room look like it includes a fireplace, heaters and/or one or more appliances (e.g., stove, over, refrigerator, dishwasher, etc.), 4) make the room look like it has bars on windows or other types of window fixtures on the windows (e.g., curtains, shades, blinds, shutters, etc.), 5) make the room look like it includes one or more light switches and/or power outlets, 6) make the room look like it includes one or more lights and/or ceiling fans, 7) make the room look like it includes one or more interior structures (e.g., door, shelves, crown molding, windows, counters, pictures, mirrors, etc.), 8) make the room look like it includes one or more safety devices [e.g., smoke detector, sprinkler system, CO detector, fire extinguisher, heat detector, etc.), 9) provide information on one or more regions of the one room structure (e.g., safety information, etc.) and/or 10) to draw attention to some object and/or location in the room (e.g., a picture of lit fire place, a picture of a hot stove, a defective electric outlet, etc.). As can be appreciated, the such designs and/or coloring an the one or more inside walls, the floor and/or the ceiling of the one room structure can used for other and/or additional reasons.

Referring now to FIG. 4, the interior of the one room structure can include multiple levels; however, this is not required. As illustrated in FIG. 4, a stairway 130 exists in the one room structure that leads to a second floor window 140. The inclusion of the stairway can be used to teach safety about the use of stairs and/or how or when stairs should be used in an emergency situation. The second floor 140 is positioned above the second floor landing 150, which landing includes a surrounding side wall 160. The second floor landing in conjunction with the second floor window can be used to teach safety about second floor windows and/or how or when to use the second floor window in an emergency situation. The top portion of the slide surface 42 of slide 40 is positioned outside the window and at or below the bottom ledge of the second floor window. Such positioning of the slide relative to the second floor window enables a child or adult to climb through the second floor window and onto the top portion of the slide surface, and then slide down the slide. As can be appreciated, many other configurations of the slide in combination with the one room structure can be used. As can also be appreciated, the one room structure can include more than two levels; however, this is not required. As can also be appreciated, the one room structure can include more than one stairway and/or more than one second floor landing.

The size of the one room structure is non-limiting. In one non-limiting embodiment of the invention, the front of the one room structure has a width of about 10-40 feet, a height of about 9-25 feet, and a depth of about 10-30 feet. In this non-limiting embodiment, the slide has a width of about 4-8 feet, a length of about 10-35 feet, and a height of about 5-20 feet.

Referring now to FIG. 5, one or more of the interior walls and/or ceiling of the one room structure includes safety information. The safety information can be printed on, attached to, etc. one or more of the interior walls and/or ceiling of the one room structure. As illustrated in FIG. 5, safety information is printed in the wall and ceiling of the one room structure. Typically the printed information is in color; however, this is not required. As shown in FIG. 5*m* the ceiling includes a drawing of a heat detector, smoke detector, CO detector, etc. and the words "BEEP!". This printed material can be used to discuss the purpose and location of a heat detector, smoke detector, CO detector, etc., the sound that such a heat detector, smoke detector, CO detector, etc. makes, and/or what to do when such sound is heard. As can be appreciated, other or additional materials can be printed and/or attached to the ceiling (e.g, sprinkler, fire, smoke, crack in ceiling, water dripping from ceiling, electric sparks, etc.) to provide visual examples for purposes of discussing safety. As can be appreciated, handout information and/or other visual aids and/or verbal discussions can be used to discuss safety. FIG. 5 also illustrates that at least one wall of the one room structure includes material printed and/or attached to the at least one wall. For instance, a window having metal bars and curtains is drawing on a wall. Printed above the window is safety information that what to do when one or more windows includes bars. Additional information can be printed on the walls regarding the windows as to 1) how to safely open a window and/or escape through a window, 2) how to safety break a window and/or pass through a broken window, 3) how to lock and/or unlock windows, 4) how to open and close windows, etc. FIG. 5 also illustrated a lit candle on top of a chest or table that is painted on the wall. A statement about not leaving the house while a candle is lit is positioned near the picture of the lit candle. These and other safety tips (e.g., safety tips about opening a door and/or talking to strangers, safety tips about using appliances, safety tips about using sharp objects, safety tips about hot and cold liquids, safety tips about wet or slippery surfaces, safety tips about climbing on counters or other objects, safety tips about electricity, safety tips about cleaning solutions and/or other potentially dangerous liquids, safety tips about using a phone in an emergency, safety tips about leaving objects on the floor, safety tips about placing flammable objects on lights or other hot objects, etc.) can be included on the one or more walls. FIG. 5 also illustrates a stack of paper next to a picture of a fireplace. A statement about not placing flammable objects near the fire is also included printed on the wall. Although FIG. 5 includes printings that make this section of the one room structure look like a family room or living room, it can be appreciated that the printings can be used to one or more sections of the one room structure to look like other regions of a home (e.g., bathroom, kitchen, garage, basement, attic, etc.).

As previously mentioned, the outside of the one room structure can include printed material and/or attachments (e.g., mail box, address, flowers, scrubs, pictures of people, doors, windows, shingles, stone, bricks, wood panels, gutters, name of building [i.e., [Fire Safety House, etc.], etc.) to make the structure have a certain look; however, this is not required.

The inflatable safety house 20 can be used as a substitute for the standard mobile safety units as described above and disclosed in U.S. Pat. Nos. 4,526,548; 5,173,052; and 5,752,835, all of which are fully incorporated herein by reference. The inflatable safety house 20 has several advantages over these standard mobile safety units in that 1) the inflatable safety house generally is less costly, 2) can be easily deflated and stored in a relatively small space, 3) can be transported and used in locations that cannot be accessed or cannot be easily accessed by standard mobile safety units (e.g., school gym, walking path accessible parks, etc.), 4) can be configured and/or customized in a variety of shapes and sizes that would be excessively expensive or impossible to make using standard mobile safety units, and/or 5) can be configure and/or customized to provide information other than fire safety information (e.g, poison control information, recycling information, energy usage information, medial information, etc.).

The invention has been described with reference to the preferred embodiment and alternatives thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

I claim:

1. An inflatable device to provide safety information to a plurality of people, said inflatable device comprising a meeting venue and a fluid supply, said meeting venue including an activity room, said meeting venue at least partially inflatable, said activity room including an inflatable wall that at least partially encloses said activity room and forms an interior and exterior inflatable wall surface, said fluid supply designed to be fluidly connected to said meeting venue to cause fluid to flow into said meeting venue and to at least partially inflate said inflatable wall, said activity room shaped and sized to enable a plurality of humans to simultaneously reside in said activity room so that the plurality of humans can simultaneously view information about safety in said activity room, an interior surface of said activity room including two or more of four different types of safety information, a first type of safety information includes one or more drawings on said interior surface of said activity room of one or more safety devices selected from the group consisting of a smoke detector, a sprinkler system, a CO detector, a fire extinguisher, and a heat detector, a second type of safety information includes one or more types of written information on said interior surface of said meeting room regarding one or more safety devices that are printed on said interior surface of said meeting room, said safety devices selected from the group consisting of window bars, smoke detector, sprinkler system, CO detector, fire extinguisher and heat detector, a third type of safety information includes one or more types of written information on an interior surface of said meeting room regarding one or more printed pictures on said interior surface of said meeting room that is selected from the group consisting of a fire, an electric spark, smoke, an electric outlet, a fireplace, window bars, a candle, a stove, a ceiling crack, and dripping water, a fourth type of safety information includes one or more types of written information on an interior surface of said meeting room regarding one or more types of information selected from the group consisting of how to safely open a window, how to safely escape through a window, how to safely break a window, how to safely pass through a broken window, how to lock a window, how to unlock a window, how to open a window, how to close a window, safety tips about opening a door, safety tips about talking to strangers, safety tips about using appliances, safety tips about using sharp objects, safety tips about hot liquids, safety tips about cold liquids, safety tips about wet surfaces, safety tips about slippery surfaces, safety tips about climbing on counters, safety tips about climbing on objects, safety tips about electricity, safety tips about cleaning solutions, safety tips about potentially dangerous liquids, safety tips about using a phone in an emergency, safety tips about leaving objects on the floor, safety tips about placing flammable objects on lights, and safety tips about placing flammable objects on hot objects, said activity room includes three inflatable walls, a roof that at least partially covers a floor of said activity room, a door opening designed to allow humans to enter said activity room, and a first window opening positioned in at least one of said inflatable walls, said first window opening spaced above said floor of said activity room and having a cross-sectional area of sufficient size to enable humans to climb through said window opening, a physical activity feature positioned adjacent to or below said first window opening and exterior to said meeting venue, said physical activity feature designed and positioned to enable humans that climb through said first window and exit said activity room to land on or access said physical activity feature, said physical activity feature including one or more activity features selected from the group consisting of a slide, an inflatable slide, a bouncing area, an inflatable bouncing area, an obstacle course, an inflatable obstacle course, a climbing rope, a ladder, an inflatable ladder, a climbing wall, an inflatable climbing wall, a climbing or sliding pole, and an inflatable climbing or sliding pole.

2. The inflatable device as defined in claim 1, wherein said activity room includes a plurality of inflatable walls, an inflatable floor that forms a majority of a floor of said activity room.

3. The inflatable device as defined in claim 2, wherein said activity room includes three inflatable walls, said inflatable floor forming all of said floor of said activity room.

4. The inflatable device as defined in claim 3, further including a physical activity feature positioned adjacent to and exterior to said meeting venue, said physical activity feature including one or more activity features selected from the group consisting of a slide, an inflatable slide, a bouncing area, an inflatable bouncing area, an obstacle course, an inflatable obstacle course, a climbing rope, a ladder, an inflatable ladder, a climbing wall, an inflatable climbing wall, a climbing or sliding pole, and an inflatable climbing or sliding pole.

5. The inflatable device as defined in claim 1, wherein said roof overlying at least 25% of said floor of said activity room.

6. The inflatable device as defined in claim 1, wherein said plurality of safety information includes said first, second, third and fourth types of safety information.

7. The inflatable device as defined in claim 1, wherein said plurality of safety information includes said first, second, third and fourth types of safety information.

8. The inflatable device as defined in claim 7, wherein said meeting venue has a shape and printing on at least one outside surface to simulate a house.

9. The inflatable device as defined in claim 1, wherein said meeting venue has a shape and printing on at least one outside surface to simulate a house.

10. An inflatable device to provide safety information to a plurality of people, said inflatable device comprising a meeting venue and a fluid supply, said meeting venue including an activity room, said meeting venue at least partially inflatable, said activity room including an inflatable wall that at least partially encloses said activity room and forms an interior and exterior inflatable wall surface, said fluid supply designed to be fluidly connected to said meeting venue to cause fluid to flow into said meeting venue and to at least partially inflate said inflatable wall, said activity room shaped and sized to enable a plurality of humans to simultaneously reside in said activity room so that the plurality of humans can simultaneously view information about safety in said activity room, an interior surface of said activity room including two or more of four different types of safety information, a first type of safety information includes one or more drawings on said interior surface of said activity room of one or more safety devices selected from the group consisting of a smoke detector, a sprinkler system, a CO detector, a fire extinguisher, and a heat detector, a second type of safety information includes one or more types of written information on said interior surface of said meeting room regarding one or more safety devices that are printed on said interior surface of said meeting room, said safety devices selected from the group consisting of window bars, smoke detector, sprinkler system, CO detector, fire extinguisher and heat detector, a third type of safety information includes one or more types of written information on an interior surface of said meeting room regarding one or more printed pictures on said interior surface of said meeting room that is selected from the group consisting of a fire, an electric spark, smoke, an electric outlet, a fireplace, window bars, a candle, a stove, a ceiling crack, and dripping water, a fourth type of safety information includes one or more types of written information on an interior surface of said meeting room regarding one or more types of information selected from the group consisting of how to safely open a window, how to safely escape through a window, how to safely break a window, how to safely pass through a broken window, how to lock a window, how to unlock a window, how to open a window, how to close a window, safety tips about opening a door, safety tips about talking to strangers, safety tips about using appliances, safety tips about using sharp objects, safety tips about hot liquids, safety tips about cold liquids, safety tips about wet surfaces, safety tips about slippery surfaces, safety tips about climbing on counters, safety tips about climbing on objects, safety tips about electricity, safety tips about cleaning solutions, safety tips about potentially dangerous liquids, safety tips about using a phone in an emergency, safety tips about leaving objects on the floor, safety tips about placing flammable objects on lights, and safety tips about placing flammable objects on hot objects, said activity room further includes an inflatable stairway, a second window opening positioned in at least one of said inflatable walls, a second floor landing positioned in an interior of said activity room and spaced above said floor of said activity room, said second floor landing positioned between said upper end of said inflatable stairway and said second window opening such that humans climbing up said inflatable stairway can exit onto said second floor landing prior to reaching said second window opening, said inflatable stairs designed to have a similar shape to stairs in a house or building, said second window opening positioned at a higher elevation than said first window opening, said second window opening having a cross-sectional area of sufficient size to enable humans to climb through said second window opening.

11. The inflatable device as defined in claim 10, wherein said roof overlying at least 25% of said floor of said activity room.

12. The inflatable device as defined in claim 11, wherein said activity room includes an inflatable floor that forms a majority of said floor of said activity room.

13. The inflatable device as defined in claim 11, wherein said roof is an inflatable roof.

14. The inflatable device as defined in claim 10, wherein said activity room includes an inflatable floor that forms a majority of said floor of said activity room.

15. The inflatable device as defined in claim 10, further including a physical activity feature positioned adjacent to or below said second window opening and exterior to said meeting venue, said physical activity feature designed and positioned to enable humans that climb through said second window and exit said activity room to land on or access said physical activity feature, said physical activity feature including one or more activity features selected from the group consisting of a slide, an inflatable slide, a bouncing area, an inflatable bouncing area, an obstacle course, an inflatable obstacle course, a climbing rope, a ladder, an inflatable ladder, a climbing wall, an inflatable climbing wall, a climbing or sliding pole, and an inflatable climbing or sliding pole.

16. The inflatable device as defined in claim 15, wherein said second level landing is supported above said floor of said activity room by an inflatable structure, said inflatable structure extending upwardly from said floor of said activity room to said second level landing.

17. The inflatable device as defined in claim 16, wherein said roof at least partially overlies said floor of said activity room and said second floor landing.

18. The inflatable device as defined in claim 17, wherein said roof is an inflatable roof.

19. The inflatable device as defined in claim 18, wherein said plurality of safety information includes said first, second, third and fourth types of safety information.

20. The inflatable device as defined in claim 19, wherein said meeting venue has a shape and printing on at least one outside surface to simulate a house.

21. The inflatable device as defined in claim 20, wherein said physical activity feature has a general shape and printing on at least one outside surface to convey an appearance of an emergency vehicle.

22. The inflatable device as defined in claim 15, wherein said physical activity feature has a general shape and printing on at least one outside surface to convey an appearance of an emergency vehicle.

23. The inflatable device as defined in claim 10, wherein said second level landing is supported above said floor of said activity room by an inflatable structure, said inflatable structure extending upwardly from said floor of said activity room to said second level landing.

24. The inflatable device as defined in claim 10, wherein said roof at least partially overlies said floor of said activity room and said second floor landing.

* * * * *